Jan. 21, 1941. E. W. HUSTED 2,229,244
DOLLY
Filed March 25, 1940 2 Sheets-Sheet 1

Inventor
E. W. Husted

By Clarence A. O'Brien
Attorney

Jan. 21, 1941.　　　E. W. HUSTED　　　2,229,244
DOLLY
Filed March 25, 1940　　　2 Sheets-Sheet 2
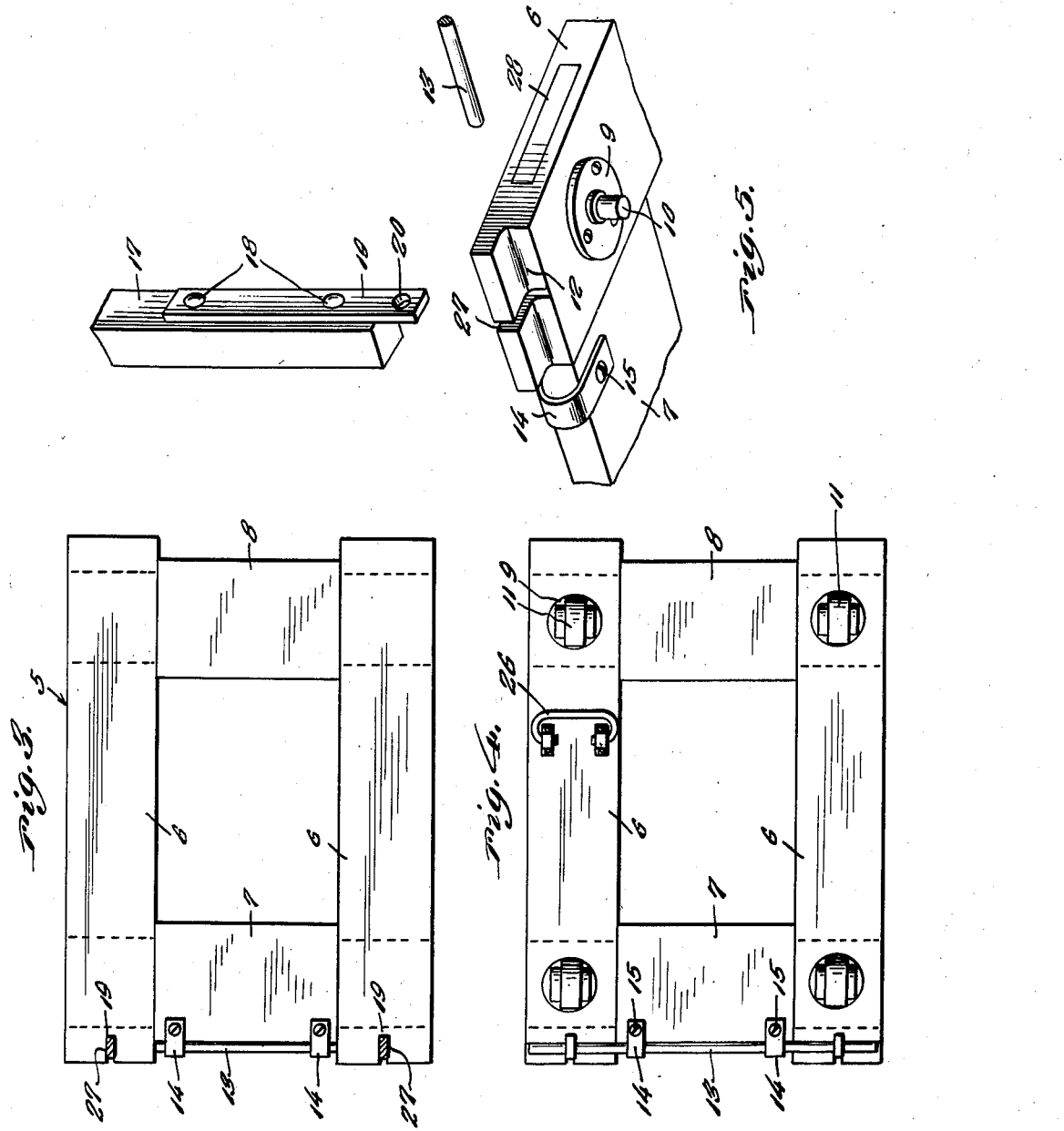

Patented Jan. 21, 1941

2,229,244

UNITED STATES PATENT OFFICE 2,229,244

DOLLY

Earle W. Husted, Utica, N. Y.

Application March 25, 1940, Serial No. 325,873

1 Claim. (Cl. 280—49)

This invention relates to a dolly or truck, and an object of the invention is to provide a dolly or truck particularly designed for use in the sure and safe handling of domestic refrigerators, particularly domestic electric refrigerators; and the invention together with its objects and advantages can be best understood from a study of the following description taken in connection with the accompanying drawings wherein:

Figure 3 is a plan view of the dolly with certain parts shown in section.

Figure 4 is a bottom plan view of the dolly, and

Figure 5 is an exploded view illustrating certain features hereinafter more fully referred to.

Figure 2:
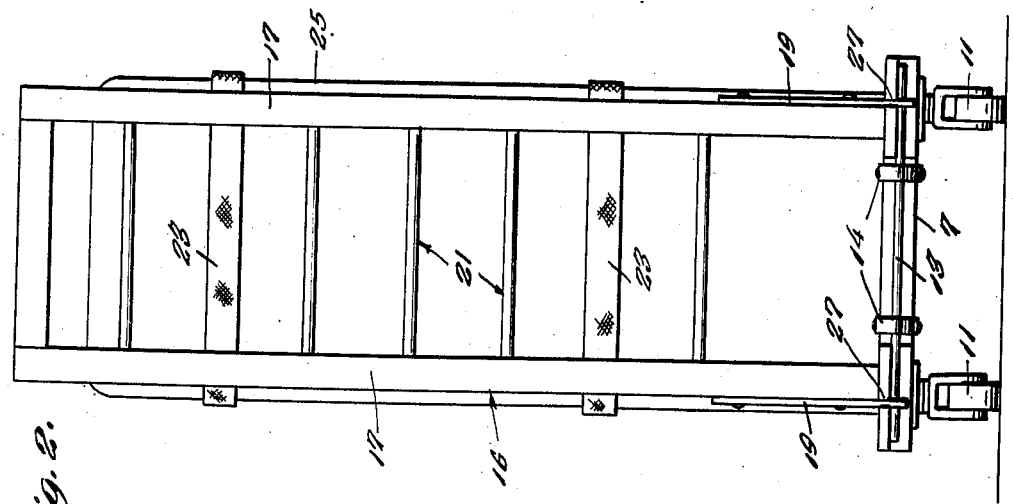
Figure 2 is a view taken at right angles to Figure 1.
Figure 1:
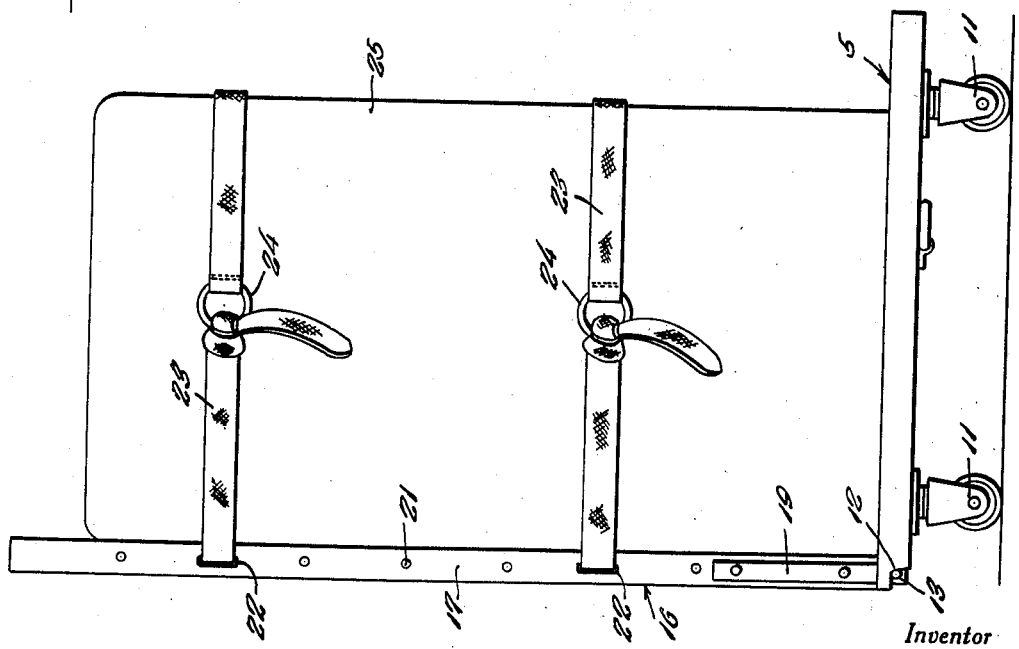
Figure 1 is a side elevational view illustrating the use of the dolly.

Referring more in detail to the drawings it will be seen that the dolly, or truck comprises a platform 5 of suitable dimensions and embodying side or longitudinal frame members 6 and transverse or cross frame members 7 and 8.

On the underside of the platform and adjacent to the corners of the platform are secured as at 9 spindles 10 that provide vertical axles for swivel casters 11, the casters being preferably rubber-tired.

At one end thereof the members 6 of the platform are notched or stepped on the undersides thereof as at 12 to accommodate the ends of a hinge rod 13 for which bearing straps 14 are provided and are suitably secured as at 15 to the end member 7, with the ends of the respective bearing straps 14 straddling the member 7 as clearly shown.

Further the dolly embodies what may be termed a gate indicated generally by the reference numeral 16.

The gate 16 comprises a pair of side rails 17 which have, at one end thereof, riveted or otherwise secured thereto as at 18 hinge plates 19 that at one end thereof extend beyond the extremity of the side bars 17 and are apertured as at 20 to accommodate the ends of the hinge rod 13 whereby said gate 16 is hingedly connected to the platform 5 at one end of the latter, and in a detachable manner.

The side rails 17 of the gate are connected by a series of spaced rounds 21 that serve to connect the side bars together.

Also the side bars 17 are provided with slots 22 through which are trained straps 23 of leather, webbing, or any other suitable material, in the present instance two such straps 23 being employed.

Also each of the straps 23 is provided at one end thereof with an eye or ring 24 for cooperation with the opposite end of the strap for securing the ends of the straps together and the straps about the refrigerator or other piece of work 25 thereon.

It will thus be seen that through the medium of the straps 23 the refrigerator is also secured to the gate 16 to swing with the gate relative to the platform 5 and as may be found desirable on occasion.

Also in accordance with the present invention the platform 5 has hingedly secured to the underside thereof a suitable handle 26 to facilitate carrying the platform 5.

Referring again to the details of structure it will be noted, and as clearly shown in Figure 5, that the stepped ends 12 of the member 6 of the platform are notched as at 27 to receive the free ends of the hinge plates or bars 19.

Also as best shown in Figure 5 the cross-frame members 7 and 8, respectively, have the opposite ends thereof reduced to fit snugly in through openings 28 provided in the frame members 6, thus permitting the members of the frame of the platform to be assembled quickly, and yet at the same time present a platform that will be relatively rigid in construction.

In actual practice it will be found that a dolly embodying the features of the present invention will make for sure and safe handling of refrigerators and similar articles in the placing of the same in, or removing the same from trucks, or in carrying such articles up and down stairs, or for relatively short distances.

It is thought that a clear understanding of the construction, manner of assembly, utility and advantages of a dolly embodying the features of the present invention will be had without a more detailed description.

Having thus described the invention what is claimed as new is:

In a dolly of the class described, a mobile platform, a gate hingedly connected to the platform adjacent one edge of the latter, said gate provided with slots, and article-embracing straps trained through said slots, said gate including a pair of side rails, bearing straps at said one edge of the platform, said platform being provided with notches at said one edge, hinge plates secured to the side rails of said gate and having ends engaging in said notches, and provided with apertures aligning with said bearings, and a hinge rod trained through said bearing straps and apertures.

EARLE W. HUSTED.